US006701984B2

(12) United States Patent

Lamontagne et al.

(10) Patent No.: US 6,701,984 B2
(45) Date of Patent: Mar. 9, 2004

(54) WOOD BOARD MADE OF A PLURALITY OF WOOD PIECES, METHOD OF MANUFACTURE AND APPARATUS

(75) Inventors: Ghislain Lamontagne, Saint-Prime (CA); Oliver Lamontagne, Saint-Prime (CA)

(73) Assignee: 9069-0470 Quebec Inc., Quebec (CA)

( * ) Notice: Subject to any disclaimer, the term of this patent is extended or adjusted under 35 U.S.C. 154(b) by 216 days.

(21) Appl. No.: 09/737,233

(22) Filed: Dec. 14, 2000

(65) Prior Publication Data

US 2001/0004482 A1 Jun. 21, 2001

Related U.S. Application Data

(60) Provisional application No. 60/177,675, filed on Jan. 27, 2000.

(30) Foreign Application Priority Data

Dec. 15, 1999 (CA) ............................................ 2292296
Jan. 24, 2000 (CA) ............................................ 2297644

(51) Int. Cl.[7] ........................... B27F 1/00; B23Q 15/00; B27M 1/08

(52) U.S. Cl. ....................... 144/347; 144/3.1; 144/90.1; 144/91; 144/91.2; 144/350; 144/355; 144/356; 144/382; 144/402; 156/250; 156/257; 156/264; 156/304.5; 52/590.1; 52/592.1

(58) Field of Search ...................... 144/392, 3.1, 134.1, 144/85, 87, 90.1, 91, 91.2, 344, 345, 346, 355, 356, 367, 368, 371, 376, 357; 156/154, 234, 250, 254, 257, 264, 304.1, 304.5; 403/364; 52/592.1, 726.1; 428/106, 172, 537.1, 304.4

(56) References Cited

U.S. PATENT DOCUMENTS

| | | | |
|---|---|---|---|
| 183,042 | A | 10/1876 | Cummings |
| 1,102,036 | A | 6/1914 | Ganter |
| 1,594,889 | A | 8/1926 | Loetscher |

(List continued on next page.)

FOREIGN PATENT DOCUMENTS

| | | |
|---|---|---|
| EP | 0 029 256 | 11/1980 |
| EP | 0029256 | 5/1981 |
| EP | 0 692 372 | 1/1996 |
| EP | 0692372 | 1/1996 |
| FR | 2457938 | 7/1979 |
| GB | 1543350 | 5/1976 |
| WO | WO 90/11488 | 10/1990 |

*Primary Examiner*—W. Donald Bray
(74) *Attorney, Agent, or Firm*—Timothy J. Keefer; Wildman, Harrold, Allen & Dixon LLP

(57) ABSTRACT

The process is used for making individual wood boards (52) from a plurality of wood pieces (10). In this process, wood pieces (10) of similar length and are joined side by side so as to form a panel (30). The panel (30) is then cut in a longitudinal direction with reference to the wood pieces (10) into panel sections (40) having a similar width. These panel sections (40) are jointed end to end to form a continuous wood board (50), which is then cut into individual wood boards (52). This process allows to manufacture wood boards (52) with a high degree of structural integrity and dimensional stability. It also allows to efficiently use small wood pieces (10) that could have been considered otherwise waste or low-grade materials, thereby increasing the yield of the sawmill.

27 Claims, 8 Drawing Sheets

U.S. PATENT DOCUMENTS

| | | | |
|---|---|---|---|
| 1,778,333 | A | 10/1930 | Neumann |
| 1,924,240 | A | 8/1933 | Harwell |
| 1,947,345 | A | 2/1934 | Lillard |
| 2,300,728 | A | 11/1942 | Goss |
| 2,544,935 | A | 3/1951 | Orner |
| 2,589,316 | A | 3/1952 | Young |
| 2,705,981 | A | 4/1955 | Smith |
| 2,789,598 | A | 4/1957 | Berger |
| 2,942,635 | A | 6/1960 | Horne |
| 3,262,723 | A | 7/1966 | Strickler |
| 3,580,760 | A | 5/1971 | Koch |
| 3,802,986 | A | 4/1974 | Forsythe |
| 3,844,320 | A | 10/1974 | Dimter |
| 3,903,943 | A | 9/1975 | Hasenwinkle |
| 3,908,725 | A | 9/1975 | Koch |
| 3,961,654 | A | 6/1976 | Hasenwinkle |
| 4,111,247 | A | 9/1978 | Hasenwinkle |
| 4,128,119 | A | 12/1978 | Maier |
| 4,224,881 | A | 9/1980 | Berry |
| 4,262,717 | A | 4/1981 | Kohn |
| 4,294,647 | A | 10/1981 | Strickler |
| 4,301,202 | A | 11/1981 | Kohn |
| 4,314,871 | A | 2/1982 | Weinstock et al. |
| 4,468,273 | A | 8/1984 | Eklund et al. |
| 4,476,663 | A | 10/1984 | Bikales |
| 4,496,421 | A | 1/1985 | Byars et al. |
| 4,624,295 | A | 11/1986 | Howland |
| 4,934,228 | A | 6/1990 | Bolton et al. |
| 5,002,105 | A | 3/1991 | Bodig |
| 5,034,259 | A | 7/1991 | Barker |
| 5,050,653 | A | 9/1991 | Brown |
| 5,059,472 | A | 10/1991 | Le Bel et al. |
| 5,080,154 | A | 1/1992 | Kallesoe |
| 5,135,597 | A | 8/1992 | Barker |
| 5,137,066 | A | 8/1992 | Dimter |
| 5,141,582 | A | 8/1992 | Scott |
| 5,486,393 | A | 1/1996 | Wiklund |
| 5,560,409 | A | 10/1996 | Knörr |
| 5,617,910 | A | 4/1997 | Hill |
| 5,881,786 | A | 3/1999 | Wilderman et al. |
| 5,888,620 | A | 3/1999 | Grenier |
| 5,927,359 | A | 7/1999 | Kersten |
| 5,944,928 | A | 8/1999 | Seidner |
| 6,025,053 | A | 2/2000 | Grenier |
| 6,082,421 | A | 7/2000 | Nicol et al. |
| 6,143,119 | A | 11/2000 | Seidner |
| 6,203,653 | B1 | 3/2001 | Seidner |

WOOD BOARD MADE OF A PLURALITY OF WOOD PIECES, METHOD OF MANUFACTURE AND APPARATUS

RELATED APPLICATIONS

The present application claims the benefits of Canadian patent application No. 2,292,296 filed Dec. 15, 1999, Canadian patent application No. 2,297,644 filed Jan. 24, 2000 and U.S. provisional patent application No. 60/177,675 filed Jan. 27, 2000, all of which are hereby incorporated by reference.

BACKGROUND

Sawmill operations generate an important percentage of what is usually considered waste or low-grade wooden materials. These wooden materials are often difficult to reuse or recycle, as opposed to waste materials in other industries such as steel, aluminum, plastic, etc. Traditionally, waste and low-grade wooden materials do not have significant value as they are not readily useful due to their lack of size or quality. They are sometimes transformed into wood chips for pulp and paper production, or simply burned or otherwise discarded.

Waste and low-grade wooden materials are resulting from sawmill operations for various reasons. A sawmill typically produces thousands of feet of lumber each day. To achieve this, a large number of logs are processed. Each log is different in size, shape and quality, and as a result, the lumber pieces that can be obtained depend on various factors.

In a sawmill, each log is generally scanned and subjected to a first breakdown in accordance with a log breakdown pattern. The pattern is calculated to obtain an optimum value out of the log. Lumber is produced in accordance with requirements of the clients of the sawmill. The first goal is usually to make a maximum number of large one-piece sections because of their high value. However, since clients order or want lumber with specific lengths, some pieces need to be trimmed. For instance, if a lumber piece is 9.5 feet (285 cm) in length but clients require lumber pieces of 8 feet (240 cm) or 10 feet (300 cm), it must be trimmed to the next smallest length, in this case, 8 feet (240 cm). This results in the waste of 18 inches (50 cm) of the original lumber piece.

Another reason for having waste or low-grade materials is that logs supplied to today's sawmills have an average diameter which is significantly smaller than those of the past centuries. As a result, lumber with a small cross section is now produced in abundance and market prices are low due to a lack of demand to match the offer.

Some of the wood slabs removed from the outer portion of the log during the first breakdown can be resawed in a second breakdown to recover useful sections, if any. However, the second breakdown generally produces small or low-grade lumber pieces, thus products whose initial value is not significant. Lumber pieces coming from the second breakdown typically have wane somewhere along one or both longitudinal sides. A side with wane is also referred to as a "wany edge". A wany edge is found on lumber that was adjacent to the original cylindrical surface of the log. Unless very small, a wany edge reduces significantly the value of a lumber piece, which is then likely to fall into the low grade category. One way of increasing the value of low-grade lumber is to saw away the wane or wanes, thereby reducing the width of the lumber piece. This process is known as "edging". Similarly, various other defects in lumber pieces could be removed by trimming them out, and making lumber pieces of smaller lengths. One of the drawbacks of the edging or trimming process is that the size or length of the processed lumber pieces is likely to be smaller than what is ordered or desired by clients.

SUMMARY

The present invention relates to a wood board, a process for making the wood board and an apparatus for making the same. This wood board is composed of a plurality of wood pieces, especially short wood pieces, thereby allowing these to be used in a more efficient way. The present invention also provides wood boards with a high degree of structural integrity and dimensional stability. The present invention also allows making wood boards in a new and improved manner. Almost any size and length of wood boards can be made in accordance with what clients need.

In brief, the process comprises the step of joining the wood pieces side by side to form a panel having longitudinal joints defined between two adjacent wood pieces. This panel is then cut in a longitudinal direction, with reference to the wood pieces, into panel sections having similar width. The panel sections are then joined end to end to form the wood board. The result of this process is a wood board having at least two sections, each made of at least two wood pieces of similar length and joined side by side. The sections are jointed end to end with an adjacent one. In this process, the panel is cut so that a majority of longitudinal joints between two adjacent sections are being disposed in an offset manner This process can also be carried out in a continuous manner in an apparatus designed for that purpose.

Other objects, features and advantages of the present invention will be more readily apparent from the following detailed description of preferred embodiments thereof, which proceeds with reference to the accompanying figures which are briefly described hereinafter.

DETAILED DESCRIPTION

Figure 1:
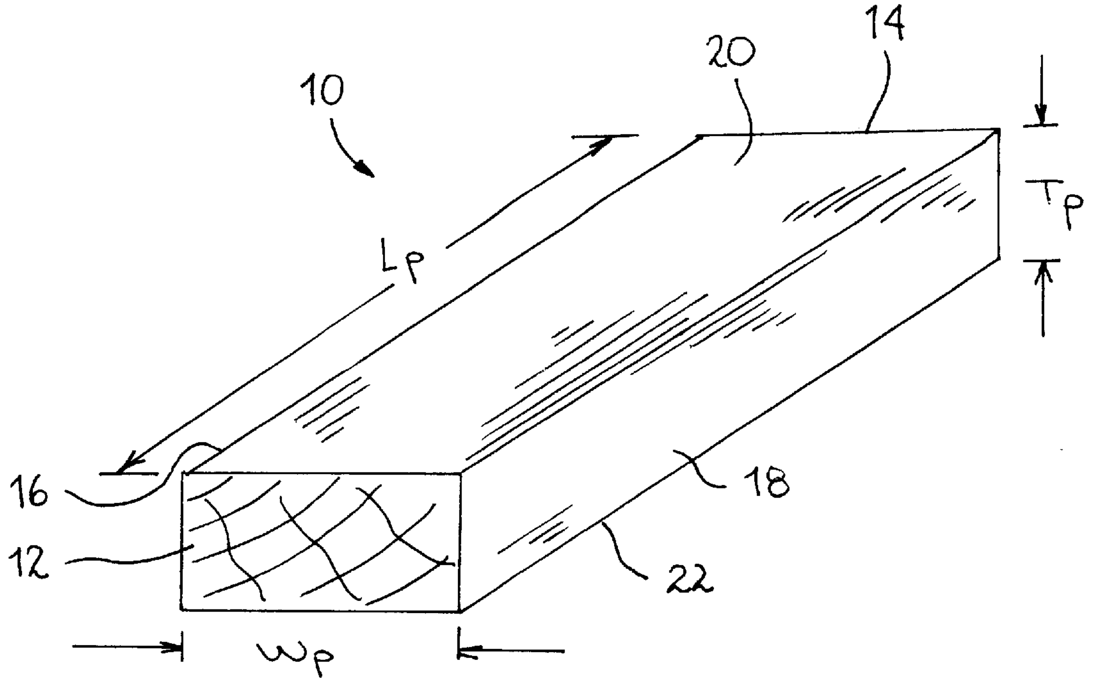
FIG. 1 is a perspective view of an exemplary wood piece.

FIG. 1 shows an example of a typical elongated wood piece (10). The wood piece (10) comprises opposite end surfaces (12, 14), hereby referred to as the "end" of the wood piece (10), and opposed side surfaces (16, 18) hereby referred to as the "sides" of the wood piece (10). There are also opposed top and bottom surfaces (20, 22).

The width of the ends of the wood piece (10) is referred to as $W_P$, its length is referred to as $L_P$, and its thickness is referred to as $T_P$. The wood piece (10) is said to be elongated since $L_P > W_P$. The wood pieces of interest generally have a length $L_P$ of at least 6 inches (15 cm). All wood pieces are preferably between 16 inches (40 cm) and 60 inches (150 cm). Smaller wood pieces could be used, particularly if they are first adjoined end to end in an end jointer, and then cut to appropriate length or lengths.

The illustrated wood piece (10) is shown as having roughly the cross section of a 2" by 4" (5 cm by 10 cm), but it is understood that this cross section may be different. The wood piece could be made of any type of suitable wood, such as spruce, pine, maple, ash, etc.

If necessary, the wood pieces (10) from the millrun are sorted according to their length so that one set of wood pieces (10) could be used at a time. It could be necessary to trim some wood pieces (10) to bring them in conformity with the length of a given set. The width of the wood pieces (10) of a same set is either substantially similar or randomly varying from one piece to another. The latter situation is preferred since it will create more offset joints, as explained later in the description. It is also possible to select and previously test specific wood pieces to manufacture wood boards with a very high strength.

Figure 2:
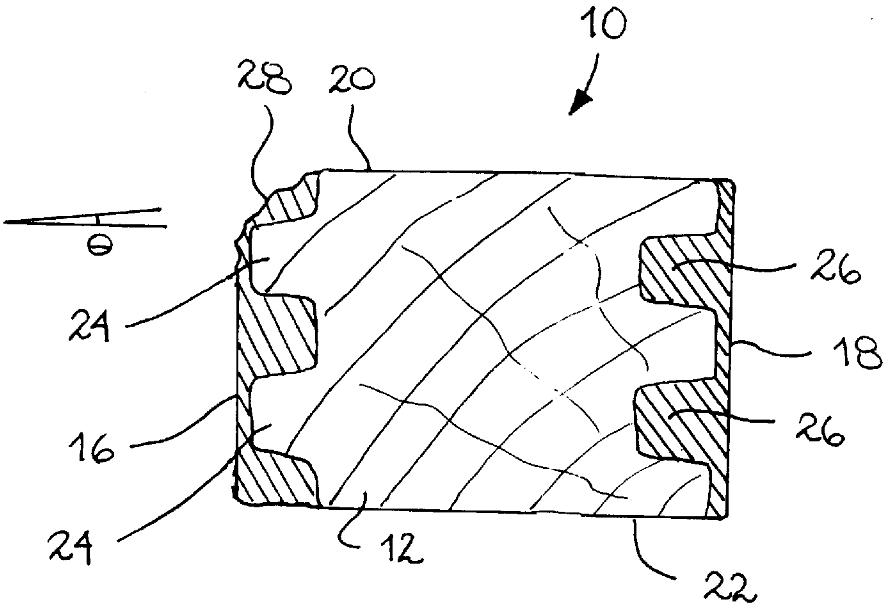
FIG. 2 is a schematic end view of a wood piece with a wany edge and after being profiled.

In accordance with the present invention, the wood pieces (10) are joined side by side to form a panel (30). It should be noted that the term "joining" is to be interpreted as rigidly connecting, jointing or otherwise bonding the elements together in an ordered fashion. In the preferred embodiment shown in FIGS. 2, 3 and 4, the longitudinal sides (16, 18) of the wood pieces (10) are first profiled and then joined together using male/female mating joints, more particularly joints having at least one tenon (24) and a complimentary mortise (26) extending over the full length on respective sides of each wood piece (10). The wood pieces (10) are machined so that their sides preferably fit together with an interlocking connection. There are two spaced-apart tenons (24) projecting sideward on one side of each wood piece (10), and two complimentary mortises (26) on the other side. The wood material removed during the profiling is shown in cross-hatched lines in FIG. 2. The illustrated wood piece (10) has a wany edge (28) on the surface thereof. The profiling can be used to remove completely or significantly the wany edge (28) by choosing the appropriate width of the resulting profiled wood piece (10). FIG. 2 shows that the wany edge (28) disappeared after the profiling. In the case of a larger wany edge, the wood piece (10) could have been made narrower to remove it.

The tenons (24) and mortises (26) are preferably configured and shaped to fit together in an interfering engagement. This results in a very tight interlocking connection with intimate frictional contact between the wood surfaces to add strength to the connection. In those instances, the tenon (24) and mortises (26) are preferably designed with a small angle (θ), preferably in the order of 3° or close to it, so as to facilitate the insertion. This angle has been found to improve the strength of the joint as well. It should be noted that other kinds of joints and arrangements can be used and devised.

Wood-bounding glue is used in the preferred embodiment to ensure a permanent rigid connection between adjacent wood pieces (10). It is also possible to use glue without a profiled joint and join a panel with straight side surfaces. Glue is applied to at least one side of the wood pieces (10) prior to joining two consecutive ones side by side. The composition of the glue will depend on the projected use of the wood boards and the relevant standards. The glue as well as the configuration and shape of the joint between two wood pieces (10) could be easily determined by a person skilled in the art. For instance, if wood boards (10) are to be used as studs, more particularly as vertical members supporting forces in compression, the glue may be a non-structural glue such as polyvinyl acetate (PVA) or urea formaldehyde. For wood boards used as structural members, a structural glue is used, such as isocyanate or phenol-resorcinol-formaldehyde (PRF).

Referring now to FIGS, 3 and 4, the panel (30) is formed by the succession of parallelly disposed and properly aligned wood pieces (10) joined together one after the other. The wood pieces (10) have a substantially coextensive thickness in order to obtain a relatively uniform panel (30) with coplanar top and bottom surfaces (20, 22). A slight variation in thickness could be acceptable depending on the cases. It is also possible to plan off or otherwise machine the resulting panel (30) in order to obtain planar surfaces. In the end, the wood pieces (10) will thus have a similar thickness.

The length of joined wood pieces (10) is preferably similar so that the resulting panel (30) has a relatively uniform width. If not, it is possible to trim or plan off one or both sides of the panel (30) so that in the end, the wood pieces (10) will have a similar length. However, the width of the wood pieces (10) of a same set and the alignment thereof could vary to some degree without creating problems since the sides of the panel (30) are preferably machined afterwards.

When manufacturing a panel (30) using sets of wood pieces (10) of different lengths, there will eventually be transitions in the width of the panel (30). The first longer or shorter wood piece (10) is joined to the side of the last wood piece (10) of the preceding set. The transition section (T), shown in FIG. 5, will later be removed from the process.

Figure 3:
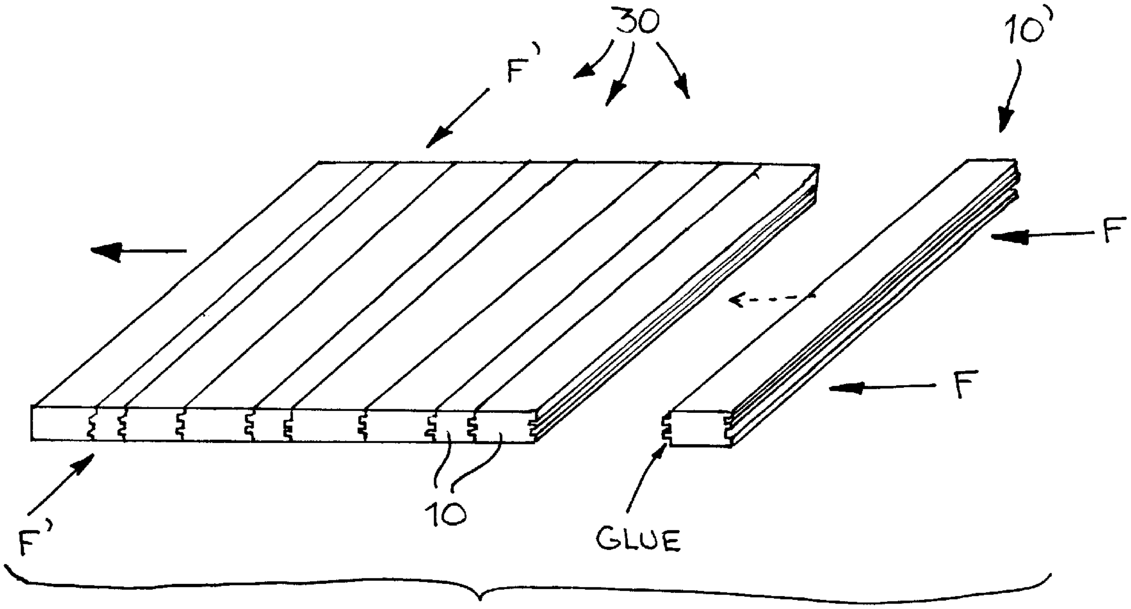
FIG. 3 is a perspective view of a panel assembled with profiled wood pieces jointed side by side.

In FIG. 3, each additional wood piece (10) is preferably joined to the side of a precedent wood piece (10) by applying an external transversal force (F) in that direction until there is no gap between them. A retention force (F') is also applied on the panel (30) to hold it while the additional wood piece (10') is joined. All these operations are made in a press designed for this purpose. The panel (30) advances each time a new wood piece (10') is added so as to make way for following wood pieces.

Figure 4:
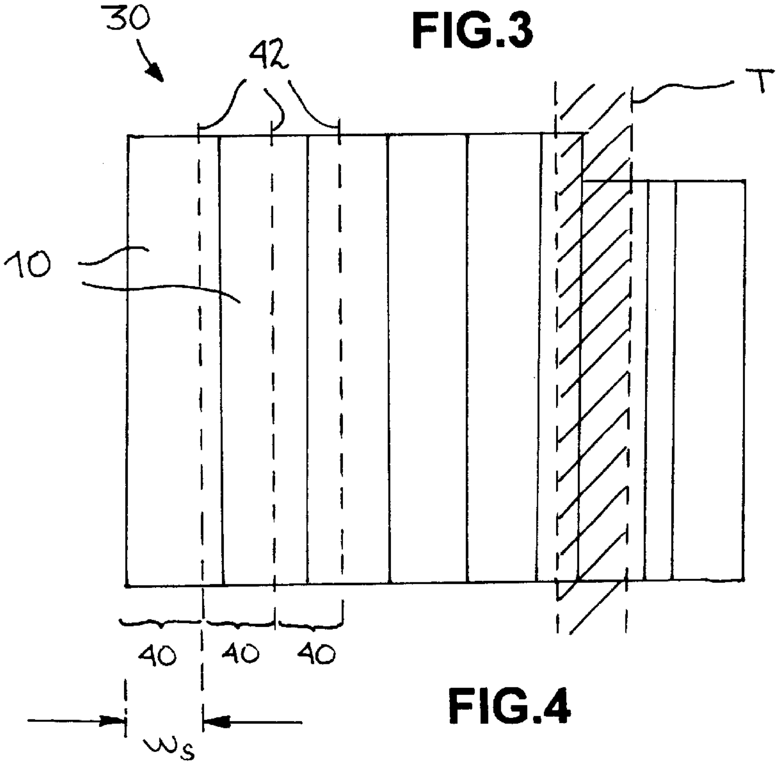
FIG. 4 is a top view of the panel of FIG. 3, the dashed lines indicating examples of where the panel could be transversally sawed into individual panel sections.

In FIG. 4, the leading end of the panel (30) is divided into sections (40) having a width $W_S$. Two or more panel sections (40) are preferably cut at the same time. In the illustrated embodiment, three panel sections (40) are sawed simultaneously. The saw pattern is shown as the dashed lines (42). These lines (42) are parallel to the longitudinal direction of the wood pieces (10), thus parallel to the joints between them. The lines (42) should be offset with the joints between two adjacent wood pieces (10) as much as possible. If all wood pieces (10) have a similar width, the position of the first saw should be adjusted to prevent the saw from coinciding with the joints and prevent joints from being all at the same relative position from one panel section to another. Also, it may happen that a saw cuts exactly on or near a joint but a small number of such occurrences is tolerable in most cases.

Since new wood pieces (10') are added constantly at the tailing end of the panel (30), the leading end of the panel (30) is preferably divided into the sections (40) as it advances. The saw or saws are then mounted on a movable carriage so as to follow the movement the leading end of the panel (30) and allow the process to be carried out in a continuous manner. The relative distance between the saws can be adjusted either manually or automatically to change the width $W_S$ in accordance with the requirements.

The panel sections (40) of a same set are substantially identical in width, length and thickness. The width $W_S$ of the panel sections (40) is either substantially that of the wood board to be formed or is much larger in order to obtain very wide wood boards, which could later be used to make narrower individual wood boards. Most panel sections (40) will be composed of two wood pieces (10) or more, depending on the width thereof. However, it is possible that some panel sections (40) have only one wood piece (10) if the width $W_S$ is smaller than the width $W_P$ of some wood pieces (10).

The resulting panel sections (40) are either stacked or directly sent to an end jointer. End jointers are used to connect short wooden strips end to end, provided that these wooden strips of a same set have an identical cross section. This allows making extended lumber pieces from a plurality of short ones. However, the width of the resulting lumber pieces is restricted to that of the wooden strips. End jointers are apparatuses known in the art and need not be explained in any greater detail.

Figure 5:
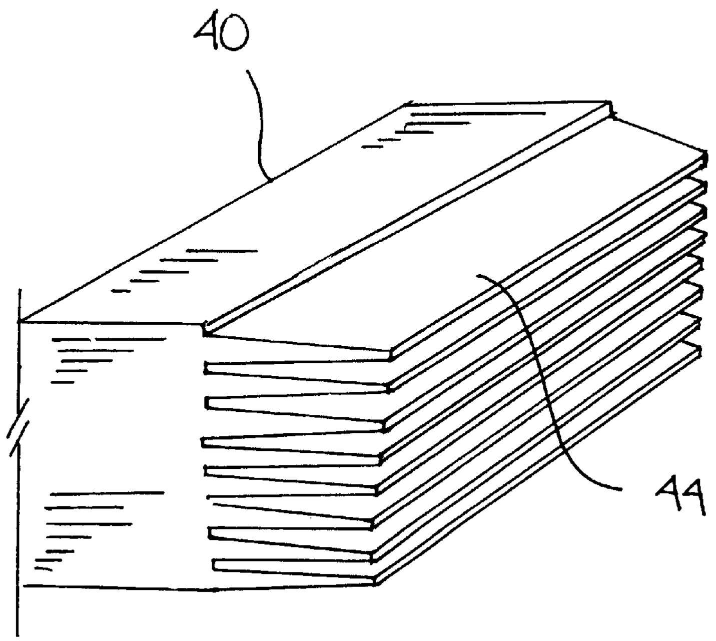
FIG. 5 is a perspective view of a profiled end of a panel section.

Jointing the panel sections (40) end to end is preferably achieved by making an interlocking connection between them. Complimentary finger-type joints (44') or any other suitable joints are machined on respective ends of each panel section (40). FIG. 5 illustrates one example thereof. These joints (44) are preferably configured and shaped to fit together in an interfering engagement. Wood-bounding glue is also preferably applied on at least one end of the panel sections (40) prior to joining them end to end.

Figure 6:
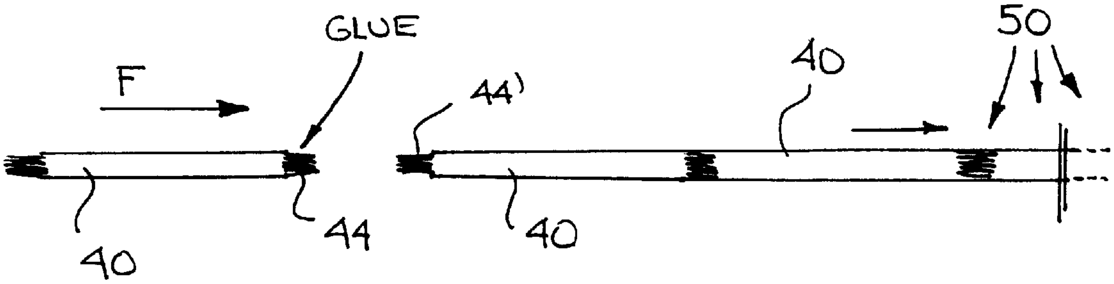
FIG. 6 is a side view of panel sections being jointed end to end.

In FIG. 6, each panel section (40) is jointed in the end jointer to a preceding panel section (40) by applying a longitudinal force on a new panel section (40). All panel sections (40) of a same set have substantially the same width, thereby forming a continuous wood board (50).

Figure 7:
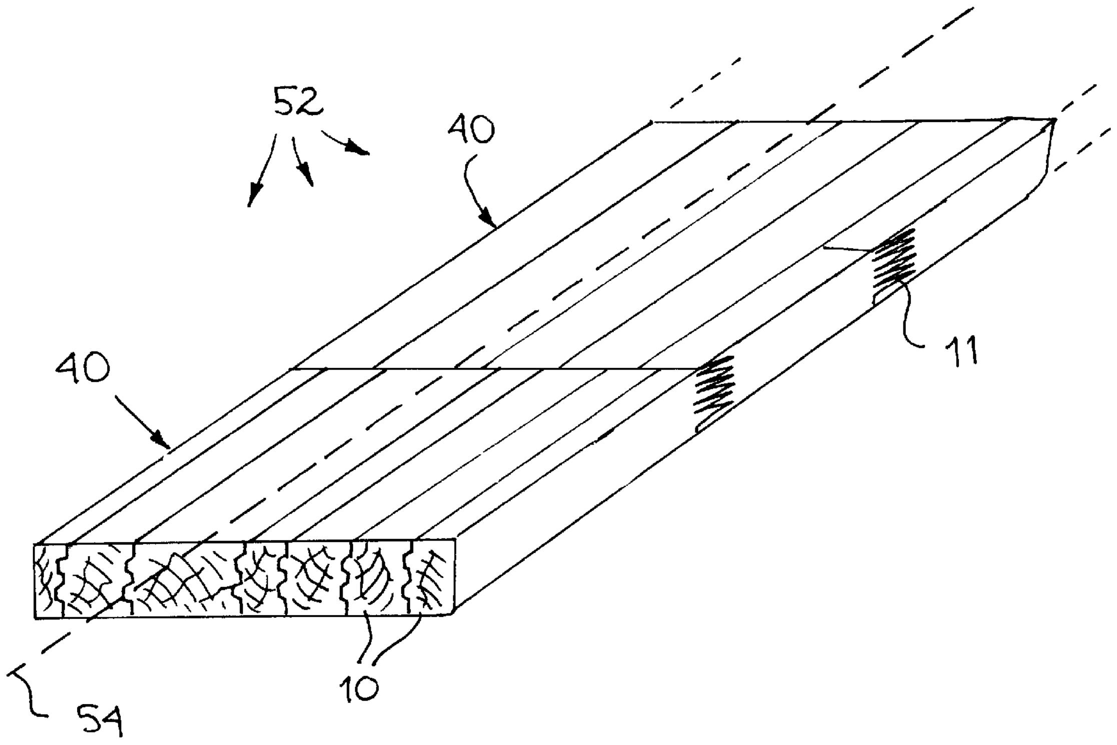
FIG. 7 is a perspective view of an individual wood board made in accordance with a preferred embodiment of the present invention.

FIG. 7 illustrates an example of an individual wood board (52). This wood board (52) was obtained by cutting the continuous wood board (50, shown in FIG. 6, once it reached the appropriate length. Each individual wood board (52) is preferably subjected to a secondary longitudinal pressing in order to ensure that all abutted ends of its panel sections (40) are in a proper position. Once this is complete, the individual wood board (52) can be either sent for storage or shipment, or be subjected to an additional process. For instance, the wood board (52) can be planned off to smooth its surfaces and edges. The wood board (52) can also be longitudinally divided into narrower wood boards to meet client requirements. The dashed line (54) indicates an example of where the wood board (52) can be cut.

FIG. 7 also shows that some of the wood pieces (10) can be made of two elongated wood segments connected end to end with a joint (11).

Figure 8:
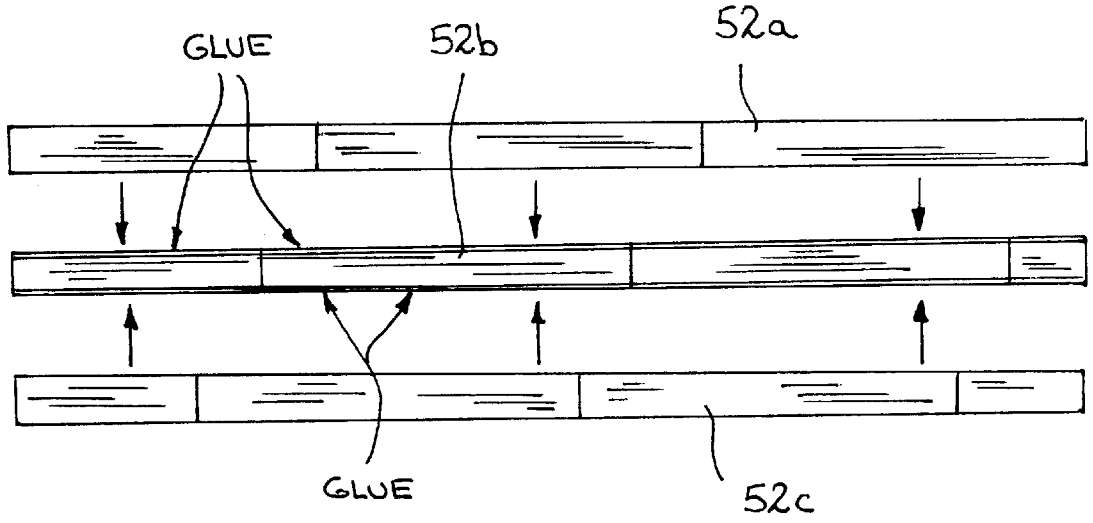
FIG. 8 is a top view showing three individual wood boards being jointed side by side to form a wider wood board.

FIG. 8 shows another possible embodiment. In this case, three individual wood boards (52*a*, 52*b*, 52*c*) are jointed side by side to make a wider wood board. The same could also be done using two wood boards or more than three. In this illustrated embodiment, both sides of the central wood board (52*b*) are preferably profiled with tenons, and the corresponding sides of the adjacent wood boards (52*a*, 52*c*) are profiled with corresponding mortises. Glue is added and the wood boards (52*a*, 52*b*, 52*c*) are brought together, as indicated by the arrows. It should be noted that the joints between adjacent panel sections (40) of a wood board are offset with reference to those of an adjacent wood board.

Figure 9:
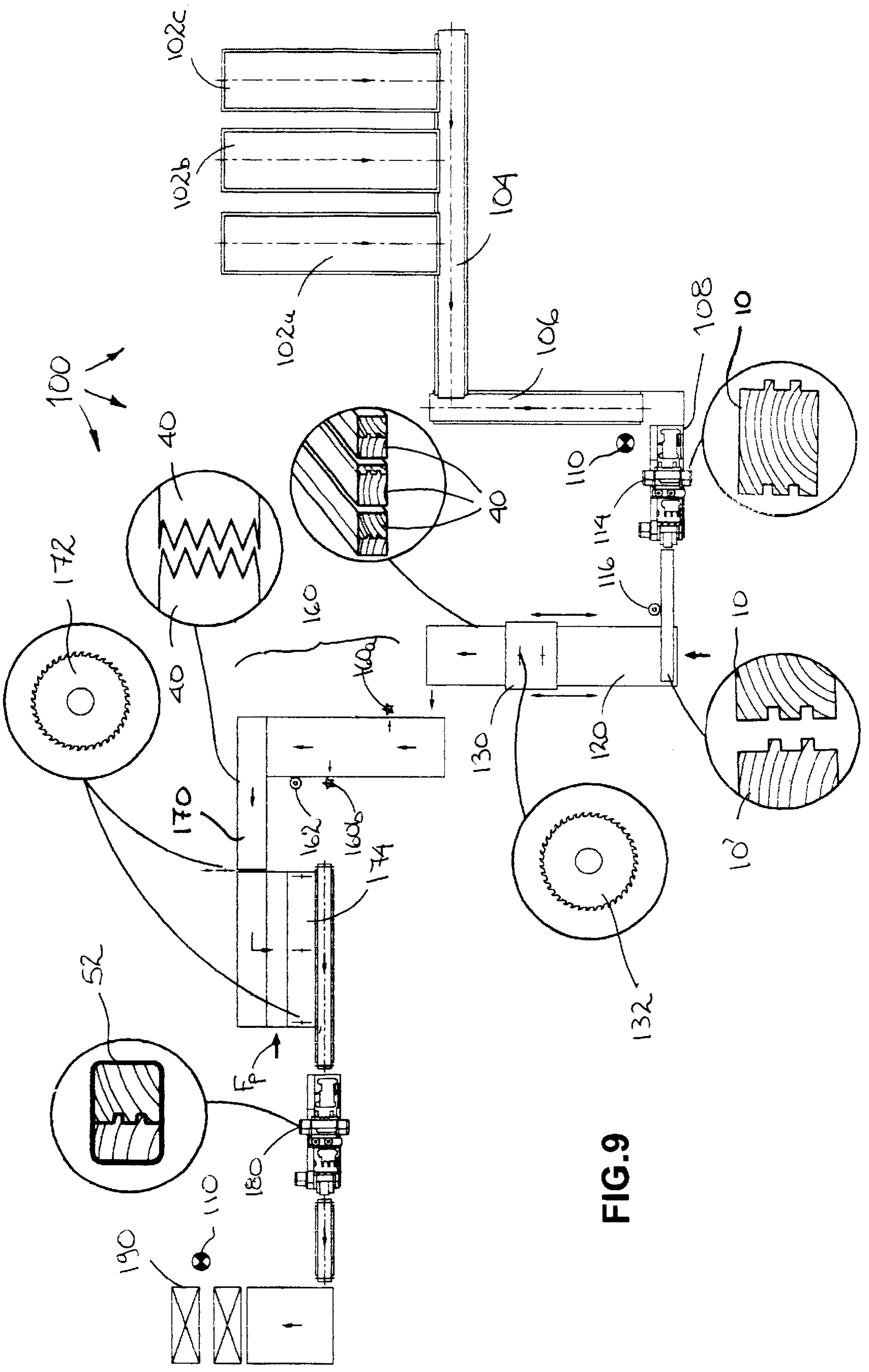
FIG. 9 is a top view of a wood board manufacturing apparatus in accordance with a first preferred embodiment of the present invention.

FIG. 9 illustrates an example of an apparatus (100) for making individual wood boards (52) in accordance with a first preferred embodiment of the present invention. In this apparatus (100), the wood pieces (10) are coming from one or a succession of infeed conveyors (not shown). The wood pieces (10) are sent into bins (102*a*, 102*b*, 102*c*) where they are stored with others having a similar length and so as to form sets of wood pieces (10).

The wood pieces (10) coming from one of the bins (102*a*, 102*b*, 102*c*) are sent to infeed tables (104, 106). The wood pieces (10) are loaded one by one on a lug chain conveyor (108) afterwards. One or more operators (110) preferably stand next to the second infeed table (106). This or these operators (110) ensure that the wood pieces (10) are properly aligned. They can also remove defective wood pieces, if any.

Figure 11:
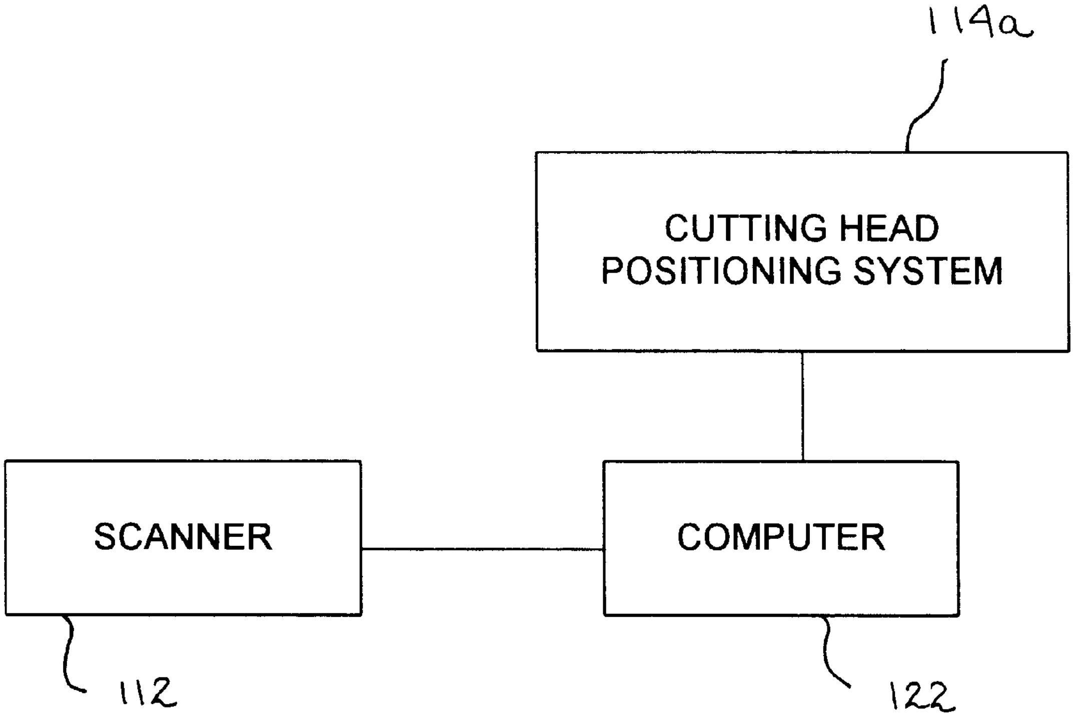
FIG. 11 is a block diagram of a possible system for controlling the position of the cutting heads of the profiler.

Each wood piece (10) is conveyed longitudinally on the lug chain conveyor (108), more particularly with one of its ends first. It is first sent under a scanner (112). As shown in FIG. 11, the scanner (112) is linked to a computer (122) which determines the optimal width for each wood piece (10). The information is relayed to a profiler (114), more particularly to the cutting head positioning system (114*a*) which controls the position of one or both cutting heads of the profiler (114). The profiler (114) machines the sides of each wood piece (10) as it travels between the cutting heads.

After the profiler (114), glue is applied to at least one side of the profiled wood piece (10) using a glue spreader or applicator (116), preferably only the one with the tenon or tenons. Next, each wood piece (10) is sent to a press (120), preferably hydraulic, where it is aligned with the preceding wood pieces (10) and pressed on the side thereof using an actuator (not shown). The whole panel (30) advances as a new wood piece (10') is added. Sufficient holding force is applied to the panel (30) to allow the new wood pieces (10') to be put in place.

Panel sections (40) are cut from the leading end of the panel (30) in a direction which is parallel to the longitudinal of the wood pieces (10). This direction corresponds to the transversal direction of the panel (30). More than one panel section (40) are preferably cut at the same time and while the panel (30) advances. To do so, the apparatus (100) is preferably provided with a movable carriage (130) on which a plurality of circular sawblades (132) are slidably mounted. The movable carriage (130) follows the movement of the panel (30) while the sawblades (132) move transversely on the movable carriage (130). The movable carriage (130) moves with the use of actuators (not shown). Also, the relative distance between the sawblades (132) is preferably adjustable, either manually or in automated manner, so that wood boards (40) of different widths could be easily produced. It should be noted that it is possible to use other arrangements to cut the panel (30), including only one saw, a saw of a different kind or a saw or saws that cut the panel (30) when it is not moving.

In the illustrated embodiment, the panel sections (40) are carried by a conveyor (140). However, it is also possible that the panel sections (40) be palletized or otherwise stacked before undertaking the next stages of the process. This may allow glue to dry before any further processing. The panel sections (40) can also be stored to be used at a later time.

The next step of the process involves the end jointer area (160). The complimentary finger joints (44, 44'), shown in FIGS. 5 and 6, are machined at both ends of each panel section (40) using cutting heads (160*a*, 160*b*). Glue is applied to one of the finger joints (44, 44'), preferably the one (44) at the leading end of the wood board (40), using a glue spreader or applicator (162).

The continuous wood board (50) is made in a press (170), preferably hydraulic, where corresponding ends of the panel sections (40) are urged together. A saw (172) cuts the continuous wood board (50) into an individual wood board (52) of the appropriate length. A lug chain conveyor (174) moves the individual wood board (52) out of the end jointer area (160). The individual wood board (52) may also be subjected to a subsequent pressing step by applying a force $F_P$ to ensure that every joint is fully in place.

The individual wood board (52) are preferably sent to a profiler (180) in order to plan off its surfaces and have rounded edges, as found in standard lumber products. The finished wood boards (52) are put in a stack (190) at the end of the process.

Figure 10:
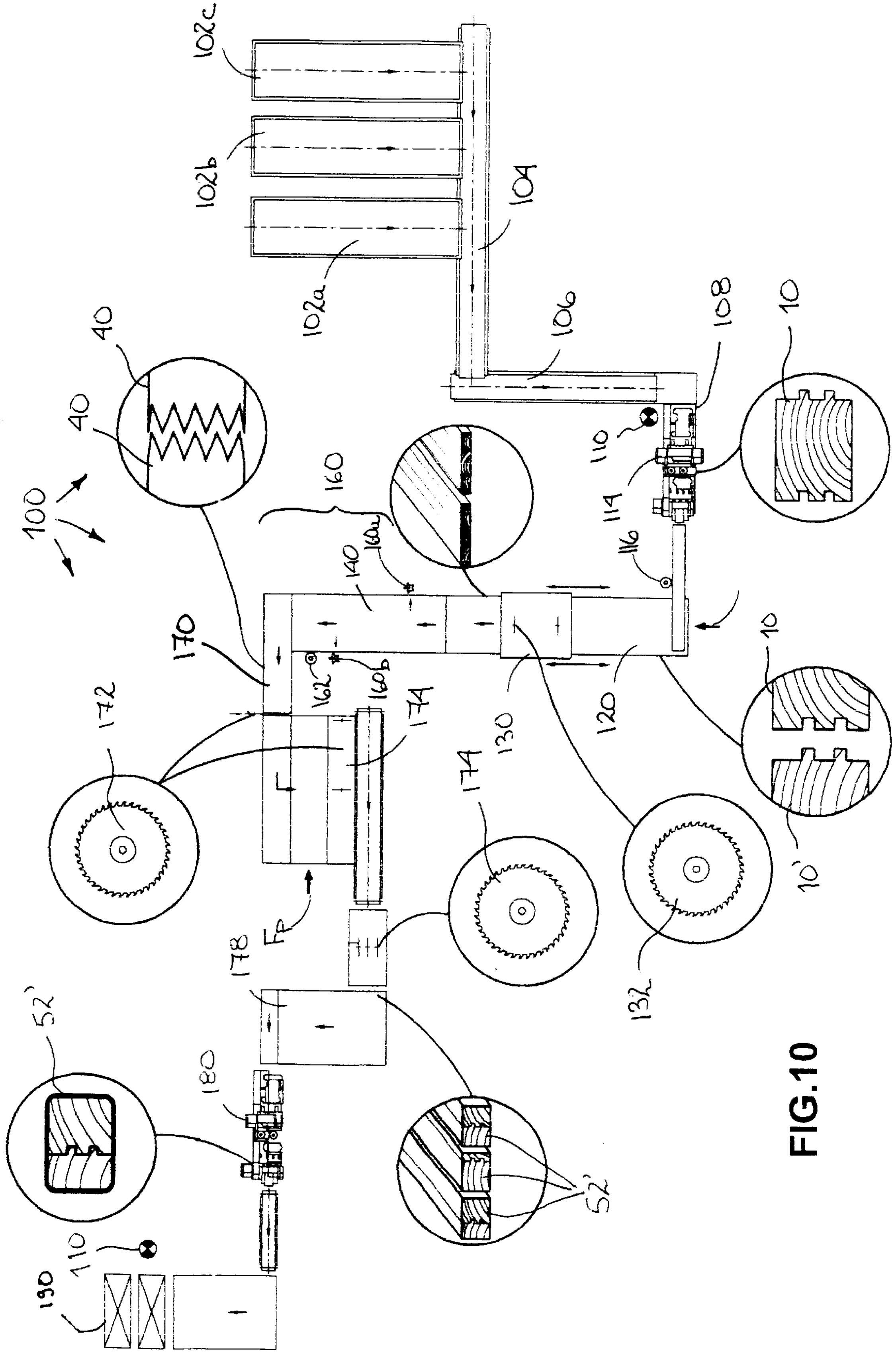
FIG. 10 is a top view of a wood board manufacturing apparatus in accordance with a second embodiment of the present invention.

FIG. 10 shows a second possible embodiment of the invention. This embodiment is very similar to that of FIG. 9, with the exception that larger panel sections (40) are jointed end to end. The individual wood boards (52) are cut longitudinally using a set of saws (174) located after the end jointer area (160). This produces a plurality of narrower individual wood boards (52') as output products. These wood boards (52') fall on a conveyor (178) and are sent to the profiler (180), as in the embodiment of FIG. 9.

As can be appreciated, the best way to carry out the present invention is to make the vast majority of joints in an individual wood board (52) offset between adjacent panel sections (40). When properly constructed, this makes the assembly stronger since cracks can not easily propagate through the entire board. Using wood pieces (10) with random widths is likely to create more diversified offset joints. Mixing the orientation of the growth rings also promotes strength.

As can also be appreciated, the resulting wood boards (52) made in accordance with the present invention will have a very high structural integrity and dimensional stability. In most cases, the structural integrity is greater than that of a one-piece equivalent while being less expensive. Waste and low-grade wooden materials are allowed to be reused very efficiently, thereby increasing the yield of the sawmill.

Another important advantage of the present invention is that custom made wood boards can be manufactured with very minimum settings of the apparatus to make them.

Although possible embodiments of the invention have been described in detail herein and illustrated in the accompanying figures, it is to be understood that the invention is not limited to these precise embodiments and that various changes and modifications may be effected therein, without departing from the scope or spirit of the present invention.

What is claimed is:

1. A process for making a wood board from a plurality of elongated wood pieces having similar length and similar thickness, the process comprising the step of:

(a) joining the wood pieces side by side to form a panel, the panel having longitudinal joints defined between two adjacent wood pieces;

(b) cutting the panel in a longitudinal direction with reference to the wood pieces into panel sections having similar width; and (c) joining the panel sections end to end to form the wood board;

wherein the panel is cut so that a majority of longitudinal joints in one panel section are offset with respect to the longitudinal joints in an adjacent panel section.

2. A process according to claim 1, wherein step (a) comprises applying glue on at least one of the sides of each wood piece prior to joining it to the side of a precedent wood piece.

3. A process according to claim 1, wherein prior to step (a), the process further comprises the step of longitudinally profiling the sides of the wood pieces to achieve an interlocking connection between each wood piece in step (a).

4. A process according to claim 3, wherein the step of longitudinally profiling the sides of the wood pieces includes machining at least one tenon and complementary mortise on respective sides of each wood piece.

5. A process according to claim 4, wherein the tenon and complementary mortise are configured and shaped to fit together in an interfering engagement.

6. A process according to claim 5, wherein step (a) comprises applying a transversal force on a wood piece to join it to the side of a precedent wood piece in the panel.

7. A process according to claim 6, further comprising the step of applying glue on at least one side of each wood piece prior to joining the wood pieces side by side.

8. A process according to claim 3, further comprising the step of applying glue on at least one of the sides of the wood pieces prior to joining the wood pieces side by side.

9. A process according to claim 3, wherein between steps (b) and (c), the process further comprises the step of profiling the ends of the panel sections to achieve an interlocking connection between each panel section in step (c).

10. A process according to claim 9, wherein the step of profiling the ends of the panel sections comprises machining complementary finger joints on respective ends of the panel sections.

11. A process according to claim 10, wherein the complementary finger joints of two consecutive panel sections are configured and shaped to fit together in an interfering engagement.

12. A process according to claim 11, wherein step (c) comprises applying a longitudinal force on each panel section to force it into engagement with a precedent panel section.

13. A process according to claim 12, further comprising the step of applying glue to at least one end of the panel sections prior to joining them end to end.

14. A process according to claim 9, wherein the process is carried out in a continuous manner to produce a continuous wood board and where after step (c), the process further comprises the step of cutting the continuous wood board into individual wood boards.

15. A process according to claim 1, wherein the wood pieces are provided with a random width.

16. A process according to claim 15, wherein before step (a), the process comprises the step of joining end to end a plurality of elongated wood segments having similar width and thickness to form an elongated assembly, and dividing the assembly to form wood pieces.

17. A process for making multiple wood boards from elongated wood pieces having similar thickness, the process comprising the steps of:

(a) providing at least one set of wood pieces, the wood pieces of each set having similar length;

(b) profiling the sides of each wood piece;

(c) applying glue to at least one side of each wood piece;

(d) joining one side of each wood piece to a corresponding side of another wood piece to form a panel made of aligned wood pieces disposed in a parallel manner and grouped with other wood pieces of similar length;

(e) cutting the panel in a longitudinal direction with reference to the wood pieces into panel sections;

(f) profiling the ends of each panel section;

(g) applying glue to at least one of the ends of each panel section;

(h) joining panel sections of similar width end to end to form a continuous wood board; and (i) cutting the continuous wood board into individual wood boards.

18. A process according to claim 17, wherein step (d) comprises applying a transversal force on each wood piece to join it to the side of a preceding wood piece in the panel.

19. A process according to claim 17, wherein step (b) comprises machining at least one tenon and complementary mortise on respective sides of each wood piece.

20. A process according to claim 19, wherein there are two tenons and complementary mortises on each wood piece, the tenons and the corresponding complementary mortises being configured and shaped to fit together in an interfering engagement.

21. A process according to claim 17, wherein step (h) comprises applying a longitudinal force to each panel section to join it to the end of a precedent panel section.

22. A process according to claim 21, wherein step (f) comprises machining complementary finger joints on the ends of the panel sections.

23. A process according to claim 22, wherein the complementary finger joints are configured and shaped to fit together in an interfering engagement.

24. A process according to claim 17, wherein after step (i), the process comprises the further step of longitudinally pressing each individual wood board.

25. A process according to claim 17, further comprising the subsequent step of planing off the individual wood boards.

26. A process according to claim 17, wherein the wood pieces are provided with a random width.

27. A wood board made according to the process set forth in claim 17.

* * * * *